(12) United States Patent
Ishikawa et al.

(10) Patent No.: US 6,308,962 B1
(45) Date of Patent: Oct. 30, 2001

(54) AXLE PIVOT ANGLE DETECTING APPARATUS FOR INDUSTRIAL VEHICLE AND INDUSTRIAL VEHICLE

(75) Inventors: Kazuo Ishikawa; Hiroyuki Fujimori; Masakatsu Suzuki; Kazuo Komori; Takaki Ogawa, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/191,331

(22) Filed: Nov. 13, 1998

(30) Foreign Application Priority Data

Nov. 18, 1997 (JP) .................................................... 9-317103

(51) Int. Cl.⁷ .................................................. B60G 17/01
(52) U.S. Cl. ..................................... 280/5.514; 280/6.157; 73/866.1
(58) Field of Search ............................. 280/5.514, 6.157, 280/6.159, 6.16, 124.111, 124.112, 124.113, 754, 755, 6.154; 73/865.9, 866.1

(56) References Cited

U.S. PATENT DOCUMENTS 4,838,574 * 6/1989 Baraszu ................................. 280/707
5,947,516 * 9/1999 Ishikawa ............................... 280/755
6,015,155 * 1/2000 Brookes et al. ................... 280/5.505
6,056,501 * 5/2000 Ishikawa et al. ..................... 414/636
6,082,742 * 7/2000 Ishikawa ........................... 280/5.508

FOREIGN PATENT DOCUMENTS

| 2230439Y | 7/1996 | (CH) | ............................. G01B/7/02 |
| 58-167215 | 10/1983 | (JP) | . |
| 58-167216 | 10/1983 | (JP) | . |
| 58-211903 | 12/1983 | (JP) | . |
| 59-050804 | 3/1984 | (JP) | . |
| 9-286218 | 11/1997 | (JP) | . |
| 9-315125 | 12/1997 | (JP) | . |

\* cited by examiner

*Primary Examiner*—Paul N. Dickson
*Assistant Examiner*—Faye M. Fleming
(74) *Attorney, Agent, or Firm*—Morgan & Finnegan, LLP

(57) ABSTRACT

An industrial vehicle has a body frame and an axle, which supports wheels and is pivotally supported by the body frame. A potentiometer is supported on the body frame and is spaced apart from the pivot axis of the axle by a predetermined distance. The potentiometer detects the pivot angle of the axle. A link mechanism amplifies motion of axle pivot and converts the axle motion into rotational or linear motion. The link mechanism then actuates the potentiometer in accordance with the converted motion.

18 Claims, 8 Drawing Sheets

AXLE PIVOT ANGLE DETECTING APPARATUS FOR INDUSTRIAL VEHICLE AND INDUSTRIAL VEHICLE

BACKGROUND OF THE INVENTION

The present invention relates to an industrial vehicle and an axle pivot angle detecting apparatus for an industrial vehicle having a pivotal axle.

In a typical industrial vehicle such as a forklift, an axle for supporting the rear wheels pivots relative to a body frame for stabilizing the body frame. However, if such a forklift is steered to change directions, lateral force generated by centrifugal force acts on the vehicle and tilts the forklift. The tilting may incline the body frame and thus destabilize the vehicle.

Japanese Unexamined Patent Publication No. 58-211903 describes a forklift that has a detecting apparatus for detecting centrifugal force. If the detected centrifugal force exceeds a predetermined value when the vehicle changes directions, a locking mechanism locks the axle to the body frame to minimize tilting of the body frame. The forklift thus turns in a stable manner.

Japanese Unexamined Patent Publication No. 58-167215 describes a forklift that has a detecting apparatus for detecting the weight of a load on forks and the height of the forks. If the detected load weight and the fork height exceed predetermined threshold values, a locking mechanism locks the axle.

Japanese Unexamined Patent Publication No. 9-315125, which was filed by the present assignee, describes an axle locking apparatus illustrated in FIG. 12. Rear wheels 91 are supported by a rear axle 92. The rear axle 92 is pivotally supported on a frame 93 by a center pin 94. A hydraulic damper 95 is located between the rear axle 92 and the frame 93. An electromagnetic valve 96 is located on the damper 95. A controller (not shown) excites or de-excites a solenoid of the valve 96 thereby locking or unlocking the damper 95. Specifically, the controller causes the damper 95 to lock the rear axle 92 when the fork height and the cargo weight are greater than predetermined threshold values. The damper 95 functions as a device for locking the rear axle 92 as well as a shock absorber. The use of the damper 95 thus reduces the number of the parts in the apparatus and simplifies the construction.

Since the threshold values are set only for the fork height and the cargo weight, the rear axle 92 may be locked while tilted relative to the frame 93. For example, the rear axle 92 may be locked even if one of the rear wheels 91 is on a step or a bump. When the forklift moves to a flat road surface thereafter, the raised rear wheel 91 loses contact with the road surface. That is, since the center of gravity is relatively close to the front wheels when the forklift carries a relatively heavy load at a relatively high position, the rear wheel 91 that was lifted by a bump remains raised. As a result, the vehicle is supported only by three wheels, or by the front wheels and the other rear wheel 91. This destabilizes the vehicle.

Further, unlocking the rear axle 92 while one of the rear wheels 91 is raised causes the raised wheel 91 to fall on the ground, which results in a great shock. This may cause cargo on a pallet carried by the forks to shift. Particularly, when the rear axle is locked, the fork height and the cargo weight are greater than the threshold values, that is, the carried cargo is heavy and is held at a high position. In this state, unlocking the rear axle 92 may shift the cargo and disrupt the operation.

The locking mechanism according to the Publication No. 58-167215 locks the axle by inserting two blocks between the body frame and the axle. However, the blocks cannot be inserted when the axle is pivoted since pivoting of the axle narrows the space between the axle and the body frame. In other words, when raised, the axle cannot be locked. Therefore, there is no subsequent shock caused by a falling wheel.

SUMMARY OF THE INVENTION

Accordingly, it is an objective of the present invention to provide an axle pivot angle detecting apparatus for industrial vehicles that detects the pivot angle of an axle supporting wheels and controls locking of the axle in accordance with the pivot angle of the axle.

To achieve and foregoing and other objectives and in accordance with the purpose of the present invention an axle pivot angle detecting apparatus for an industrial vehicle is provided. The vehicle has an axle that supports a wheel and is pivotally supported on a frame about a pivot axis. The apparatus includes a detector for detecting the pivot angle of the axle and a converter for converting pivot motion of the axle into rotational or linear motion. The detector is located on the frame or the axle. The converter actuates the detector in accordance with the converted motion and is spaced from the pivot axis.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described in reference to FIGS. 1–8.

Figure 6:
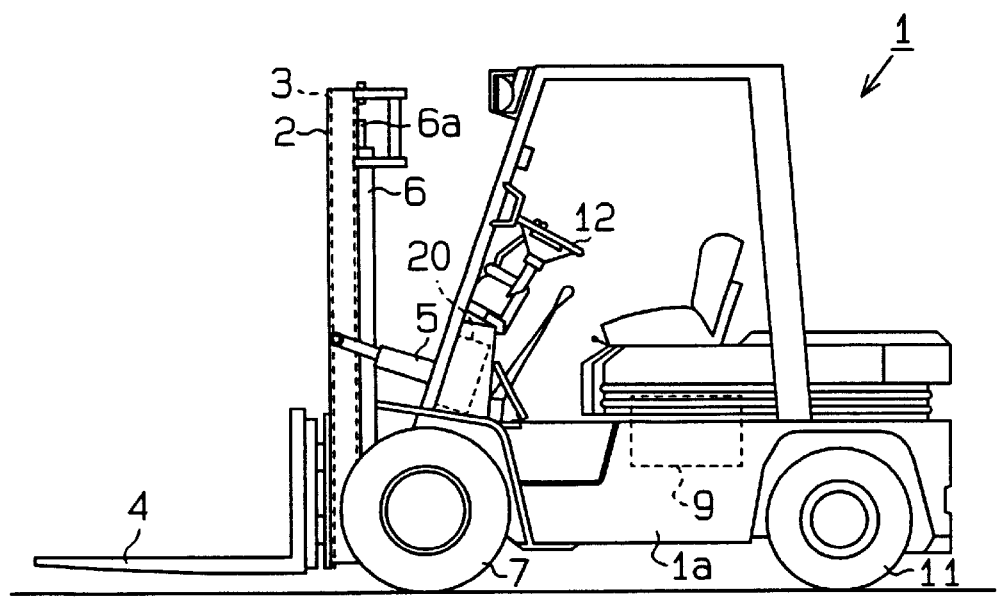
FIG. 6 is a side view illustrating the forklift of FIG. 5.

A forklift 1 illustrated in FIG. 6 has driven front wheels 7 and steered rear wheels 11. A pair of outer masts 2 are arranged on the front of a body frame 1a. A pair of inner masts 3 are arranged between the outer masts 2. A fork 4 is coupled to each inner mast 3 by a chain and a lift sprocket (neither is shown). The outer masts 2 are coupled to the body frame 1a by tilt cylinders 5, which tilt the masts relative to the body frame 1a. A lift cylinder 6 is located on the rear side of each outer mast 2. Each lift cylinder 6 includes a piston rod 6a, which is coupled to the top end of the corresponding inner mast 3. The lift cylinders 6 extend and retract the piston rods 6a thereby lift and lower the forks 4.

Figure 4:
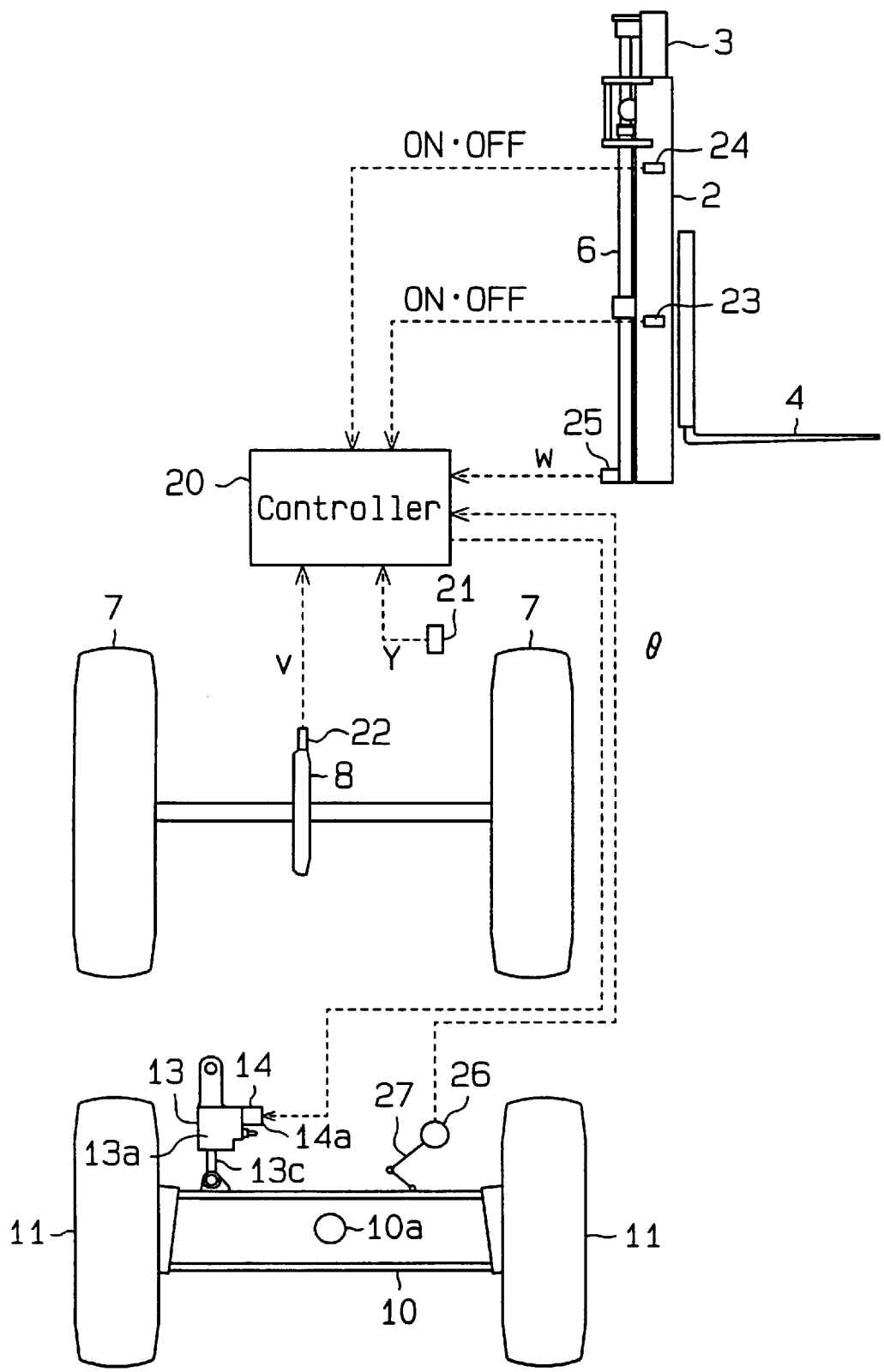
FIG. 4 is a diagrammatic view showing an axle pivot control apparatus employed in the forklift of the first embodiment.
Figure 5:
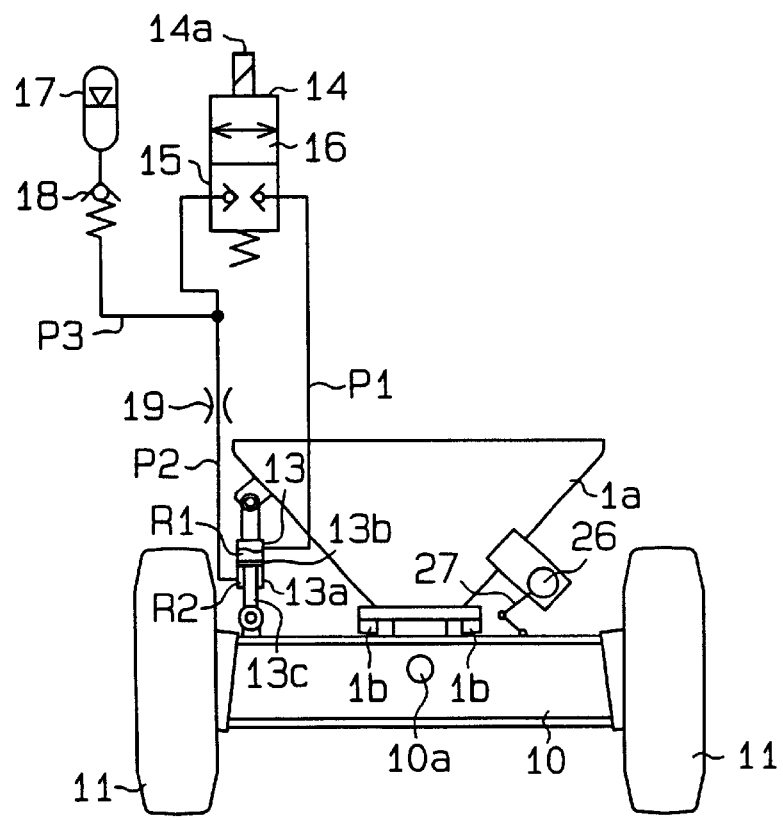
FIG. 5 is a schematic rear view illustrating the forklift of FIG. 4.

Each front wheel 7 is connected to an engine 9 by a differential ring gear 8 (see FIG. 4) and a transmission (not shown). Thus, the front wheels 7 are driven by the engine 9. As shown in FIGS. 4 and 5, a rear axle 10 extends through the lower rear portion of the body frame 1a. The rear axle 10 is secured to the bottom of the body frame 1a by a center pin 10a and pivots about the center pin 10a. The rear wheels 11, which are steered to turn the vehicle, are coupled to the ends of the rear axle 10. A steering cylinder (not shown) is located on the rear axle 10. The steering cylinder includes a pair of piston rods each coupled to one of the rear wheels 11. The steering cylinder is controlled by a steering wheel 12 thereby steering the rear wheels 11.

As shown in FIG. 5, a damper (hydraulic cylinder) 13 connects the rear axle 10 to the body frame 1a. The damper 13 includes a housing 13a and a piston 13b. The housing 13a is coupled to the body frame 1a, and the piston 13b includes a piston rod 13c extending therefrom. The distal end of the piston rod 13c is coupled to the rear axle 10.

The piston 13b defines a first chamber R1 and a second chamber R2 in the housing 13a. The first and second chambers R1, R2 are connected with first and second passages P1, P2, respectively. The first passage P1 and the second passage P2 communicate the first chamber R1 and the second chamber R2 with a control valve 14, respectively. The control valve 14 is a normally closed, two-way switch valve that has two ports and a spool. The spool has a disconnection position 15 and a connection position 16. The second passage P2 is coupled to an accumulator 17 by a third passage P3 and a check valve 18. The accumulator 17 stores hydraulic oil and compensates for hydraulic oil leakage from the damper 13. The second passage P2 includes a throttle 19.

When the spool of the valve 14 is at the closed position 15, as shown in FIG. 5, oil flow between the chambers R1, R2 is prohibited. Accordingly, the damper 13 is locked. As a result, the rear axle 10 is locked to the body frame 1a and cannot pivot. When at the connection position 16, which is opposite to the disconnection position 15 shown in FIG. 5, the spool permits oil flow between the chambers R1, R2. In this state, the damper 13 is unlocked and the rear axle 10 is pivotable. Pivoting of the axle 10 is limited by a pair of stoppers 1b formed on the bottom of the frame 1a. Specifically, the stoppers 1b limit pivoting of the axle 10 within a range of ±4°. The control valve 14 is controlled by a controller 20 mounted on the front of the frame 1a.

As shown in FIG. 4, the forklift 1 includes a yaw rate sensor 21, a vehicle speed sensor 22, two fork height sensors 23, 24, a pressure sensor 25 and a potentiometer 26. The sensors 21–25 and the potentiometer 26 are employed in axle pivot control for locking the rear axle 10 and are connected to the controller 20.

The yaw rate sensor 21 includes, for example, a gyroscope and is fixed to the front of the body frame 1a in a predetermined orientation for detecting the yaw rate Y (rad/sec), or angular velocity, of the forklift 1. The gyroscope of the sensor 21 may be a piezoelectric type, a gas-rate type or an optical type.

The vehicle speed sensor 22 detects the rotational speed of the gear 8 thereby measuring the speed V of the forklift 1. The sensor 22 then outputs a signal indicative of the forklift speed V to the controller 20.

The fork height sensors 23, 24 are located on one of the outer masts 2 at predetermined heights. The sensors 23, 24 include, for example, limit switches. The maximum height Hmax of the forks 4 is five or six meters. The height sensor 23 is turned off when the height of the forks 4 is smaller than two meters and is turned on when the fork height is two meters or greater. The height sensor 24 is turned off when the fork height is smaller than four meters and is turned on when the fork height is four meters or greater. Thus, the height sensors 23, 24 divide the fork height into three height ranges, or a low height range (zero to two meters), a middle height range (two to four meters) and a high height range (four meters and higher). Referring to signals from the height sensors, 23, 24, the controller 20 judges which range the forks 4 are in.

The pressure sensor 25 is located at the bottom of one of the lift cylinders 6 and detects the pressure in the cylinder 6. The pressure in the lift cylinder 6 is a function of the weight w on the forks 4. The sensor 25 thus indirectly detects the weight w on the forks 4 and sends the detected value to the controller 20. Referring to the inputted value, the controller 20 judges whether the weight w is greater than a predetermined value w0. The value w0 is a reference value for judging the weight w. The controller 20 judges that the weight w is relatively light when it is equal to or lighter than the reference value w0 (w≦w0). The controller 20 judges that the weight w is relatively heavy when it is heavier than the reference value w0 (w>w0).

As shown in FIGS. 4 and 5, the potentiometer 26 is located on a side of the body frame 1a for detecting the pivot angle θ of the rear axle 10. The potentiometer 26 is coupled to the rear axle 10 by a link mechanism 27. The link mechanism 27 converts pivot motion of the rear axle 10 into rotational motion. The potentiometer 26 detects the rotational motion and sends the detected value to the controller 20. The pivot angle θ is the angle of the rear axle relative to a horizontal plane that is fixed relative to the frame 1a. The pivot angle θ is zero degrees when the rear axle 10 is parallel to the horizontal plane of the frame 1a, and the range of the pivot angle is minus four degrees to plus four degrees (−4°≦θ≦4°). The potentiometer 26 and the link mechanism 27 constitute a pivot angle detecting apparatus 28.

The structure of the pivot angle detecting apparatus 28 will now be described with reference to FIGS. 1 to 3.

Figure 1:
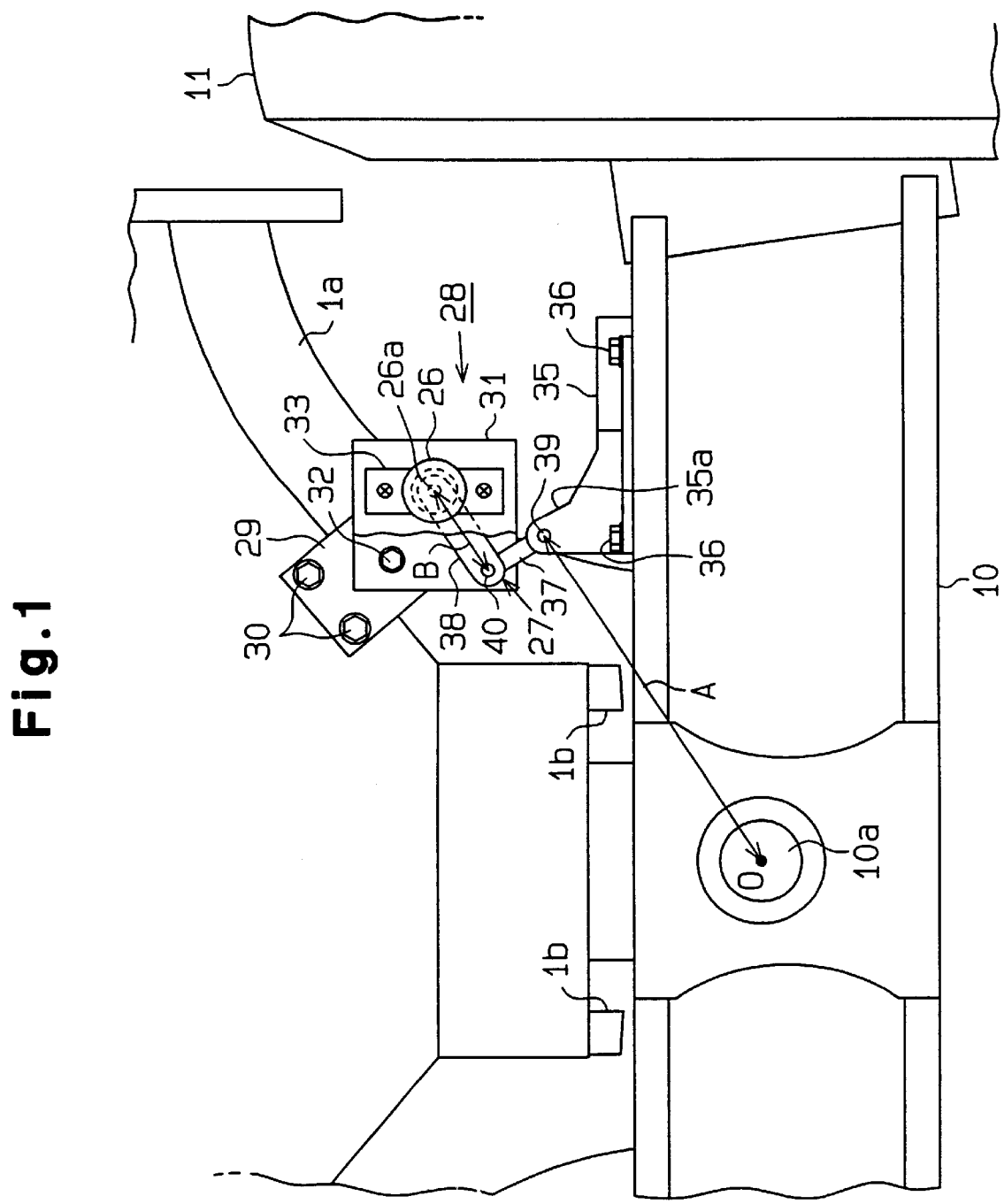
FIG. 1 is a partial rear view illustrating an axle angle detecting apparatus mounted on a forklift according to a first embodiment.
Figure 2:
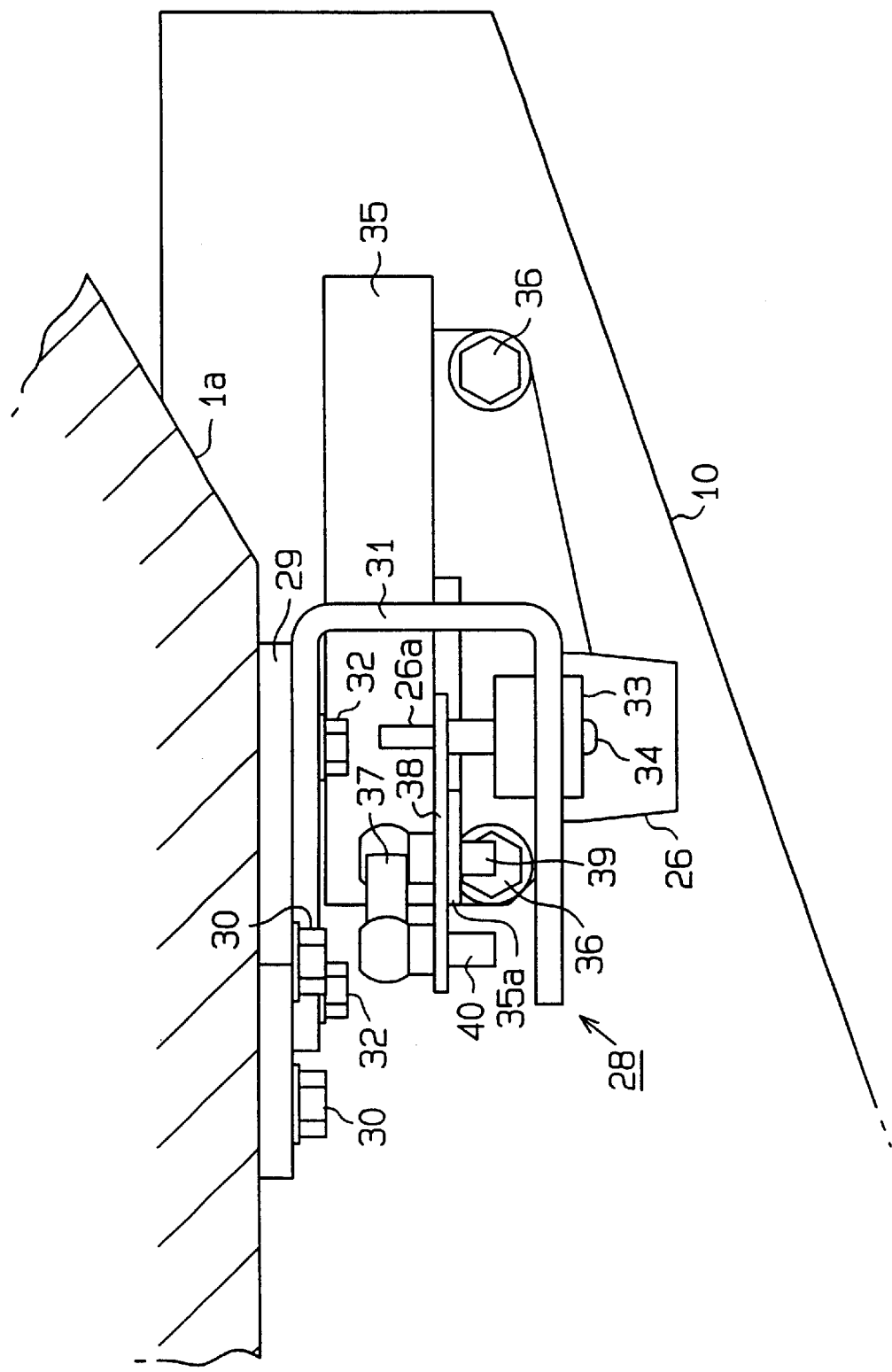
FIG. 2 is an enlarged top view of FIG. 1.
Figure 3:
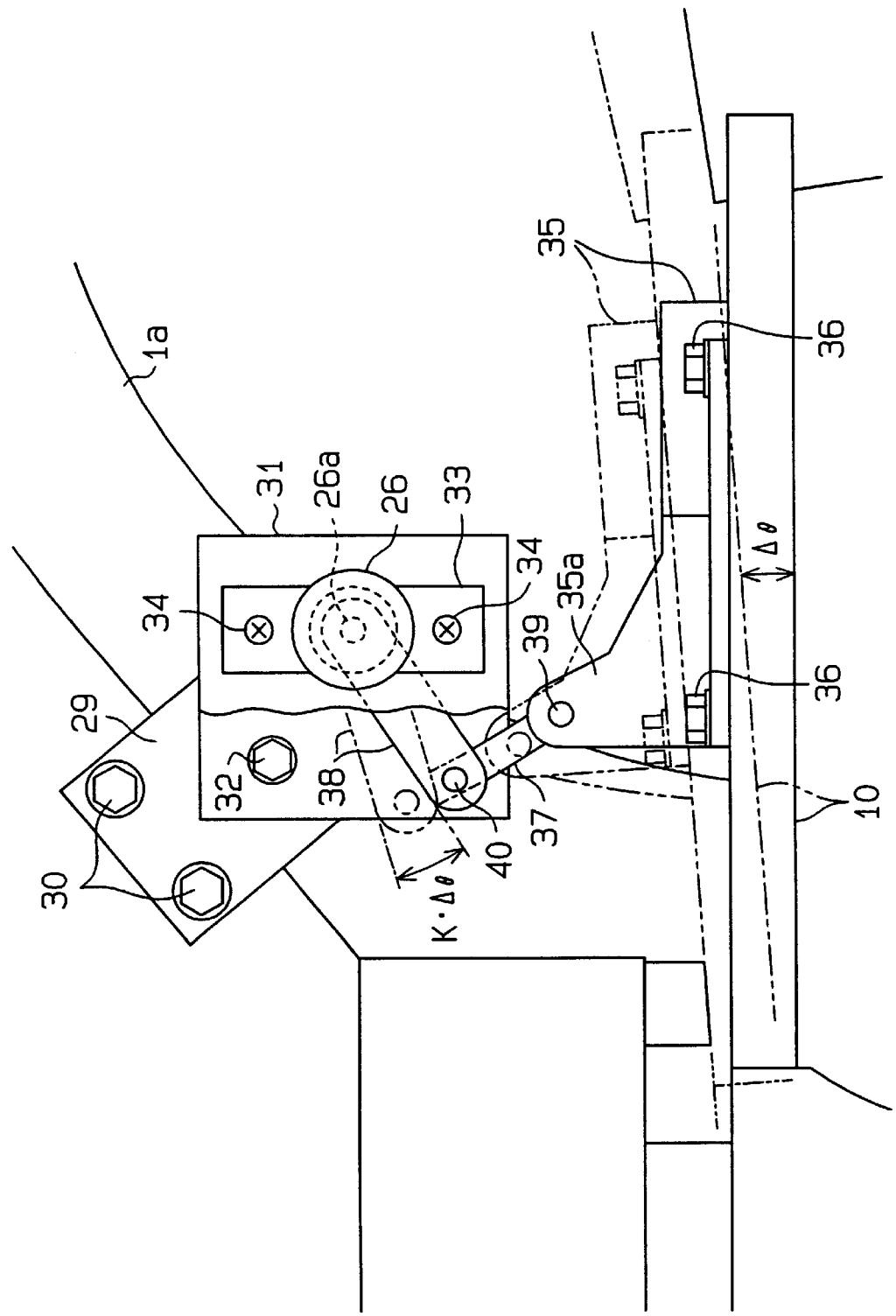
FIG. 3 is an enlarged view of FIG. 1.

As shown in FIGS. 1 and 2, a first bracket 29 is fixed to a side of the body frame 1a by bolts 30. The first bracket 29 extends diagonally downward toward the rear axle 10. A U-shaped second bracket 31 is fixed to the first bracket 29 by a bolt 32. The potentiometer 26 extends through a wall of the second bracket 31 and is fixed to the second bracket 31 by a supporting plate 33. An input shaft 26a of the potentiometer 26 is located inside the second bracket 31.

A third bracket 35 is fixed to the top surface of the rear axle 10 directly below the second bracket 31. The third bracket 35 includes a wall 35a extending upward. The link mechanism 27 includes a short first link 37 and a long second link 38. The lower end of the first link 37 is pivotally coupled to the wall 35a by a pin 39. The upper end of the first link 37 is pivotally coupled to the lower end of the second link 38 by a pin 40. The upper end of the second link 38 is fixed to the input shaft 26a of the potentiometer 26. The link mechanism 27 converts pivot motion of the rear axle 10 into rotational motion of the input shaft 26a.

Rotation of the rear axle 10 about the center pin 10a is not directly detected. Instead, the potentiometer 26 detects motion of the rear axle 10. Since the potentiometer 26 and the bracket 35 are relatively far from the center pin 10a, the motion detected by the potentiometer 26 is relatively large. However, if the potentiometer 26 is too close to the rear wheel 11, foreign matter scattered by the rear wheel 11 may damage the potentiometer 26. Therefore, a safe distance exists between the potentiometer 26 and the wheel 11. Also, the second bracket 31 has a middle wall facing the rear wheel 11 and an opening facing the center pin 10a. The links 37, 38 and the input shaft 26a of the potentiometer 26 are located inside the second bracket 31. The second bracket 31 therefore protects the input shaft 26a and the links 37, 38 from mud and pebbles scattered by the rear wheel 11.

As shown in FIG. 1, the distance between the axis of the center pin 10a and the lower end of the first link 37 (the center of the pin 39) is defined as a distance A. The length of the second link 38 (the distance between the axis of the input shaft 26a and the center of the pin 40) is defined as a distance B. If a rear axle 10 pivots by an angle $\Delta\theta$ as illustrated in FIG. 3, the input shaft 26a is rotated by an angle obtained by multiplying the angle change $\Delta\theta$ by a number K, which is greater than one. The number K is the distance A divided by the distance B (K=A/B). The lower end of the first link 37 is located as far as possible from the center of the center pin 10a for maximizing the number K. For the same reason, the length of the second link 38 is minimized. In the embodiment of FIGS. 1–8, the number K (A/B) is approximately four (A/B≈4). Thus, the angle change $\Delta\theta$ of the rear axle 10 is amplified by four when inputted into the input shaft 26a. The angle change $\Delta\theta$ is amplified if the number K is greater than one.

Axle pivot control performed by the controller 20 will now be described.

The controller 20 includes a microcomputer and a read only memory (neither is shown). The microcomputer executes an axle pivot control program stored in the read only memory (ROM) at predetermined time intervals, for example, every ten milliseconds. The axle pivot control program refers to a control procedure for locking the rear axle when the traveling state of the forklift and the state of a load on the forks satisfy predetermined conditions. The sensors 21, 22 detect the traveling state and the sensors 23, 24 and 25 detect the state of the load.

The traveling state of the forklift 1 is judged based on the rate of change $\Delta Y/\Delta T$ of the yaw rate Y and the lateral acceleration Gs, which acts on the forklift 1 when the forklift 1 is turning. The lateral acceleration Gs is computed by multiplying the vehicle speed V by the yaw rate Y (Gs=V·Y). The rate of change $\Delta Y/\Delta T$ of the yaw rate Y is computed based on the difference between the yaw rate Y in a previous routine and the yaw rate Y in the current routine. When either of the values Gs and $\Delta Y/\Delta T$ exceeds a corresponding determination value g0 and y0, the controller 20 locks the rear axle 10.

The locking condition regarding the load state (load condition) is satisfied when the center of gravity of the forklift is high due to a high fork position and a heavy load on the forks. When the load condition is satisfied, the rear axle 10 is normally locked. However, even if the load condition is satisfied, the rear axle 10 is not locked if the absolute value of the pivot angle $\theta$ detected by the potentiometer 26, or the angle of the rear axle 10 relative to the body frame 1a, exceeds two degrees ($\theta>2°$ or $\theta<-2°$). That is, the rear axle 10 is not locked when the pivot angle $\theta$ is in one of the free regions of FIG. 8. The rear axle 10 is therefore prevented from being locked when one of the rear wheels 11 runs over a step or a bump.

Figure 7:
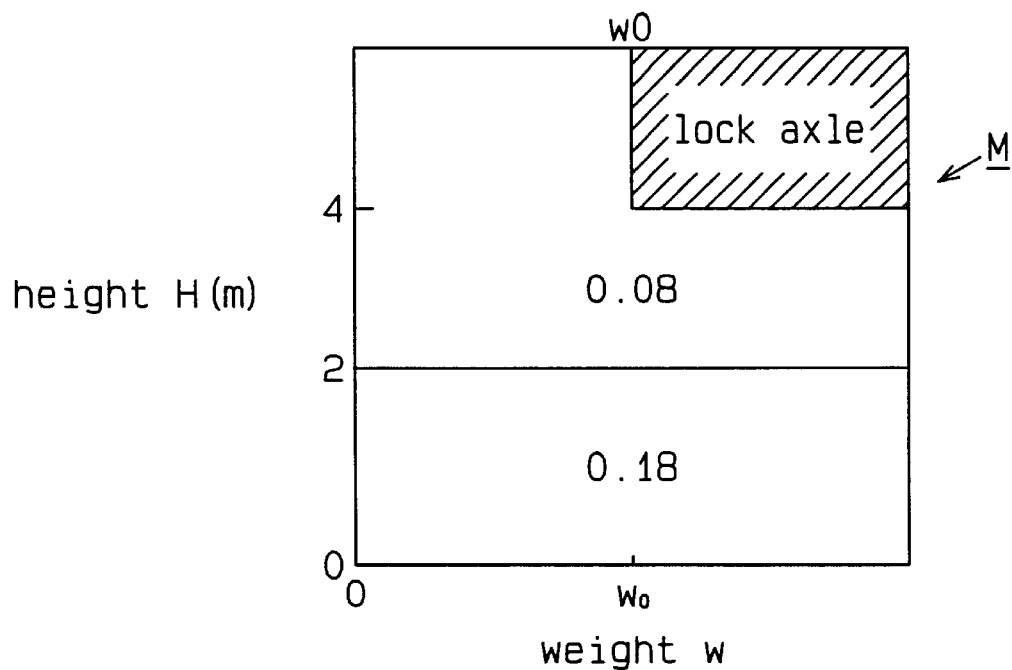
FIG. 7 is a map used in axle pivot control for the forklift of FIG. 4.
Figure 8:
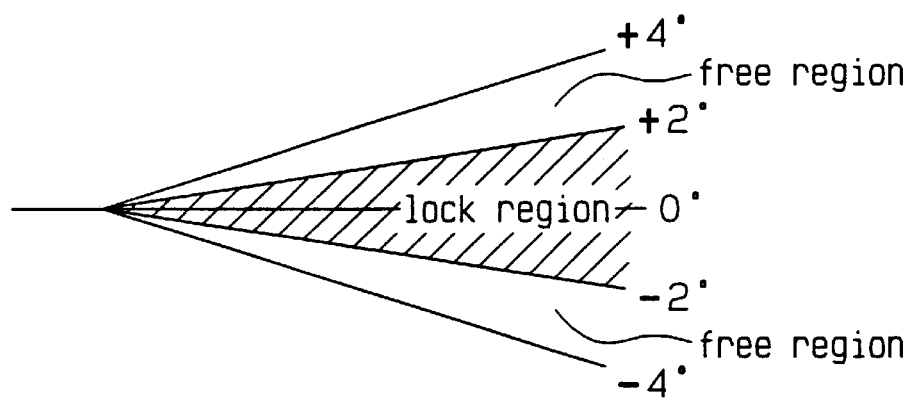
FIG. 8 is a diagram showing the pivot ranges of a rear axle.

The map M of FIG. 7 is used for determining whether the load condition is satisfied. The map M is also referred to for selecting a threshold value g0 of the lateral acceleration Gs. According to the map M, the rear axle 10 is locked when the forks 4 are high (H≧4 m) and the load is heavy (w≧w0). The lateral acceleration has two threshold values (g0). When the fork height is less than two meters, the threshold value g0 is set, for example, at 0.18 (N). When the fork height is equal to or greater than two meters, the threshold value g0 is set, for example, at 0.08 (N). The threshold values g0, y0 are determined based on road tests or are theoretically calculated such that locking of the rear axle 10 stabilizes the forklift. The values g0, y0 are changed in accordance with the type of the vehicle or the conditions in which the vehicle is used.

During operation of the forklift 1, the microcomputer in the controller 20 executes the angle pivot control. The microcomputer reads the yaw rate Y, the vehicle speed V, the fork height H, the load weight w and the pivot angle $\theta$ for detecting the traveling state and the load state of the forklift 1. For judging the traveling state, the microcomputer computes the rate of change $\Delta Y/\Delta T$ of the yaw rate Y (yaw acceleration) and the lateral acceleration Gs (Gs=V·Y) based on the detected values Y and V.

The threshold value g0 of the lateral acceleration Gs is set to 0.08 or to 0.18 in accordance with the current load state. If the rate of change $\Delta Y/\Delta T$ of the yaw rate Y is equal to or greater than the threshold value y0 or if the lateral acceleration Gs is equal to or greater than the threshold value g0, the rear axle 10 is locked.

When the forklift 1 starts turning after traveling in a straight line, the rear axle 10 is locked if the value $\Delta Y/\Delta T$ is equal to or greater than y0 ($\Delta Y/\Delta T \geq y0$). Therefore, the rear axle 10 is locked, while still unpivoted before the lateral acceleration Gs reaches the threshold value g0. If the forklift 1 changes direction, the steering wheel 12 is rotated and the lateral acceleration Gs becomes zero during the direction change. However, the value $\Delta Y/\Delta T$ is maintained equal to or greater than y0 ($\Delta Y/\Delta T \geq y0$) while the steering wheel 12 is being rotated. The rear axle 10 thus remains locked during the change of direction and the forklift 1 remains stable.

When loading or unloading the forks 4, the rear axle 10 is locked when the load condition is satisfied even if the axle angle $\theta$ is in the range between minus two degrees and two degrees ($-2°\leq\theta\leq2°$). Therefore, when the center of gravity of the vehicle is relatively high, the forklift 1 is not easily inclined to right or to left. That is, the forklift 1 is stable when loading or unloading the forks 4.

When loading or unloading the forks 4, one of the rear wheels 11 may ride onto a significantly large step or a bump. This will pivot the rear axle 10 relative to the body frame 1a by an angle greater than two degrees ($\theta>2°$ or $\theta<-2°$). In this state, the rear axle 10 is not locked even if the load condition for locking is satisfied. Instead, the rear axle 10 is free to pivot. When the forklift 1 moves to a flat road surface, pivoting of the rear axle 10 allows the rear wheel 11 that was on a step or a bump to ride off the step or the bump and to contact the flat road surface. Thus, the forklift 1 does not move with one rear wheel 11 raised from the road surface.

Since the forklift 1 is supported by four points, or by the two front wheels 7 and the two rear wheels 11, after running over a step or a bump, the forklift 1 is stable. Further, the rear wheel 11 that is on the step or the bump is slowly moved off of the step or the bump. Therefore, running over the step or the bump gives little shock to the forklift 1.

When one wheel of the forklift 1 runs over a step or a bump, the rear axle 10 is free to pivot if the absolute value of the pivot angle θ is greater than two degrees. However, pivoting of the rear axle 10 causes little problem since the stoppers 1b limit the angle θ of the rear axle 10 within four degrees. Further, when the absolute value of the pivot angle θ is greater than two degrees, the rear axle 10 is locked if either one of the inequalities Gs≧g0 and ΔY/ΔT≧y0 is satisfied.

An angle change Δθ of the rear axle 10 is approximately quadrupled by the link mechanism 27. The input shaft 26a of the potentiometer 26 is therefore rotated by the quadrupled angle change Δθ. This allows the pivot angle θ of the rear axle 10 to be accurately detected. As a result, the pivot angle control procedure, which is based on the pivot angle θ of the rear axle 10, is accurate and reliable.

The embodiment of FIGS. 1–8 has the following advantages.

(a) The potentiometer 26 is spaced apart from the axis of the center pin 10a by a predetermined distance. A pivot angle change Δθ of the rear axle 10 is amplified by the link mechanism 27. Therefore, the pivot angle θ of the rear axle 10 is accurately detected. The link mechanism 27 also allows a small change of the rear axle pivot angle θ to be positively detected. Accordingly, the lock control procedure of the rear axle 10 based on the pivot angle θ is accurate. The potentiometer 26 reduces the cost of the sensor.

(b) The ratio (A/B) of the distance A between the center 0 of the center pin 10a and the fixed end of the first link 37 to the length B of the second link 38 is greater than one. Particularly, in the embodiment of FIGS. 1–8, the ratio A/B is approximately four (A/B≈4). Therefore, changes of the pivot angle θ are quadrupled when detected. This allows changes of the pivot angle θ to be positively detected.

(c) The pivot angle detecting apparatus 28 is located inward of a vertical plane that is half-way between the corresponding rear wheel 11 and the center pin 10a. This location prevents foreign matters scattered by the rear wheel 11 from damaging the parts of the apparatus 28. Further, the input shaft 26a and the link mechanism 27 are covered by the second bracket 31. The second bracket 31 protects the shaft 26a and the mechanism 27 from foreign matter such as mud and pebbles. The potentiometer 26 is therefore less vulnerable to malfunction.

(d) The potentiometer 26 and the controller 20 are supported on the same body frame 1a. Thus, electric wires from the controller 26 are easily connected to the potentiometer 26.

(e) When the forks 4 are high and the load is heavy, the rear axle 10 is free to pivot if the absolute value of the axle pivot angle θ is greater than two degrees. Therefore, the rear axle 10 is not locked when one of the rear wheels 11 is on a step or a bump. When the forklift 1 moves to a flat place after running over a step or a bump, the rear axle 10 pivots and thus allows the rear wheel 11 to contact the road surface. The forklift 1 is therefore loaded and unloaded in a stable manner.

(f) When the forks 4 are high and the load is heavy, the rear axle 10 is locked if the pivoting of the rear axle 10 is equal to or smaller than two degrees. Thus, even if the center of gravity is relatively high, the body frame 1a is not easily inclined to right or to left. This stabilizes loading and unloading of the forklift 1.

A second embodiment of the present invention will now be described with reference to FIG. 9. The differences from the embodiment of FIGS. 1–8 will mainly be discussed below, and like or the same reference numerals are given to those components that are like or the same as the corresponding components of the embodiment of FIGS. 1–8. A pivot angle detecting apparatus of FIG. 9 has a different structure from that of the embodiment of FIGS. 1–8.

Figure 9:
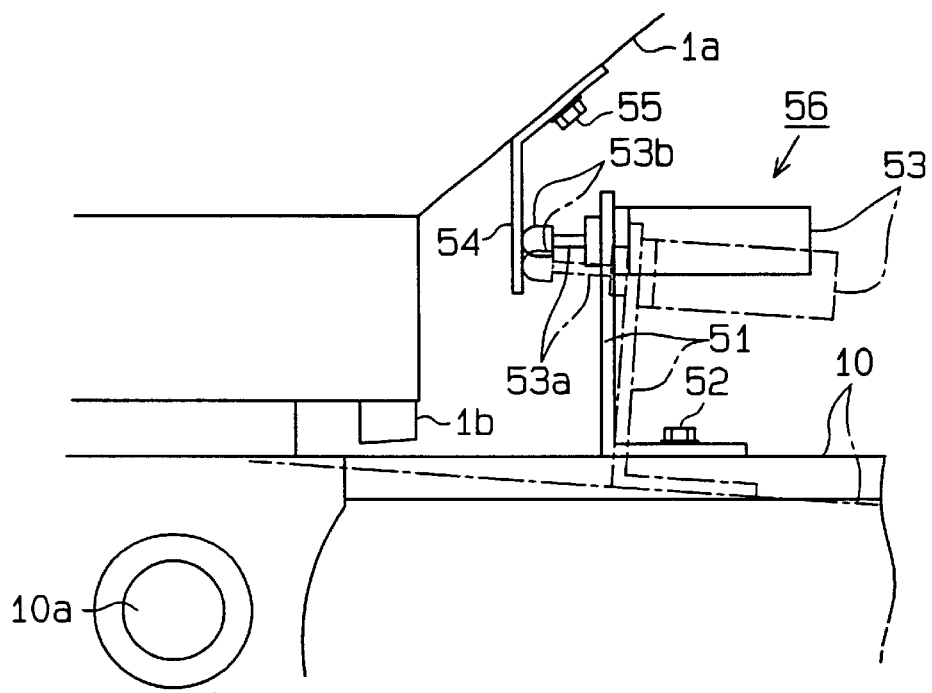
FIG. 9 is a partial rear view illustrating an axle angle detecting apparatus according to a second embodiment.

As shown in FIG. 9, an L shaped bracket 51 is fixed to the top surface of the rear axle 10 by a bolt 52. The bracket 51 extends upward and is spaced apart from the center pin 10a by a predetermined distance. A stroke sensor 53 is fixed to the upper portion of the bracket 51. An input shaft 53a of the sensor 53 extends toward the center of the vehicle and parallel to the rear axle 10. A detection plate 54 is fixed to a side of the body frame 1a by a bolt 55 and faces the input shaft 53a. The input shaft 53a is urged to extend from the housing of the sensor 53. A contact follower 53b at the distal end of the shaft 53a contacts the detection plate 54. The distance between the distal end of the contact follower 53b and the center pin 10a is greater than one half of the distance between the axis of the center pin 10a and the axis of the joint between the rear wheel 11 and the rear axle 10. Also, the stroke sensor 53 is sufficiently far inward from the rear wheel 11 such that foreign matter scattered by the rear wheel 11 does not damage the sensor 53. When the pivot angle of the rear axle 10 changes, the length of the input shaft 53a changes, accordingly. The pivot angle of the rear axle 10 is detected based on changes in the extension of the shaft 53a.

In the apparatus 56 of FIG. 9. the distal end of the contact follower 53b is further from the axis of the pin 10a than the half-way point between the axis of the center pin 10a and the axis of the joint between the axle 10 and the rear wheel 11. This construction increases changes in the length of the input shaft 53a for a given change in the pivot angle θ. In other words, the construction amplifies changes Δθ of the rear axle pivot angle θ. Therefore, the pivot angle θ is accurately detected. Further, the embodiment of FIG. 9 has the advantages (a), (e) and (f) of the embodiment of FIGS. 1–8.

A third embodiment of the present invention will now be described with reference to FIGS. 10 and 11. The differences from the embodiment of FIGS. 1–8 will mainly be discussed below, and like or the same reference numerals are given to those components that are like or the same as the corresponding components of the embodiment of FIGS. 1–8. A pivot angle detecting apparatus 69 illustrated in the embodiment of FIGS. 10 and 11 has a different structure from that of the embodiment of FIGS. 1–8.

Figure 10:
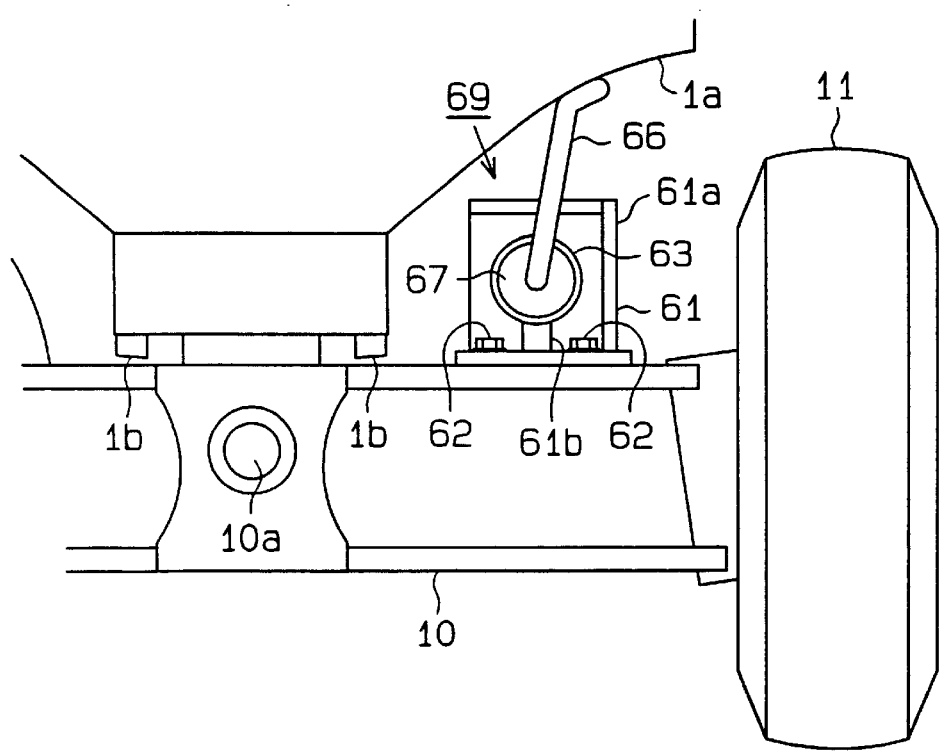
FIG. 10 is a partial rear view illustrating an axle angle detecting apparatus according to a third embodiment.

As shown in FIG. 10, a support 61 is fixed to the top surface of the rear axle 10 by bolts 62. The support 61 is spaced apart from the center pin 10a by a predetermined distance. The support 61 includes a cover 61a, which is shaped like a box with parts cut away. A sensor, or a potentiometer 63, is fixed to a side wall of the cover 61a by a bolt 65 with a support plate 64 in between.

An L-shaped lever 66 is fixed to an input shaft 63a of the potentiometer 63. The input shaft 63a is rotated integrally with the lever 66. When the distal end of the lever 66, or a follower end, is moved with respect to the axle 10 by pivoting of the axle 10. The horizontal portion of the lever 66 is inserted into a cylinder 67, which is fixed to a base support 61b. A collar 66a fixed to the lever 66 is housed in the cylinder 67. A coil torsion spring 68 is wound about the lever 66 and extends between the collar 66a and one end of the cylinder 67. The ends of the spring 68 are secured to the collar 66a and the cylinder 67, respectively. The spring 68 therefore urges the lever 66 such that the lever 66 rotates in one direction. As shown in FIG. 10, the spring 68 urges the lever 66 against a side of the body frame 1a.

The distance between the distal end of the lever 66 and the axis of the center pin 10a is greater than one half of the distance between the axis of the center pin 10a and the axis of the joint between the rear wheel 11 and the rear axle 10. However, the potentiometer 63 is sufficiently far inward from the rear wheel 11 such that foreign matter scattered by the rear wheel 11 does not damage the potentiometer 63. Also, the cover 61a protects the input shaft 63a and the adjacent parts from mud and pebbles scattered by the corresponding rear wheel 11.

Figure 11:
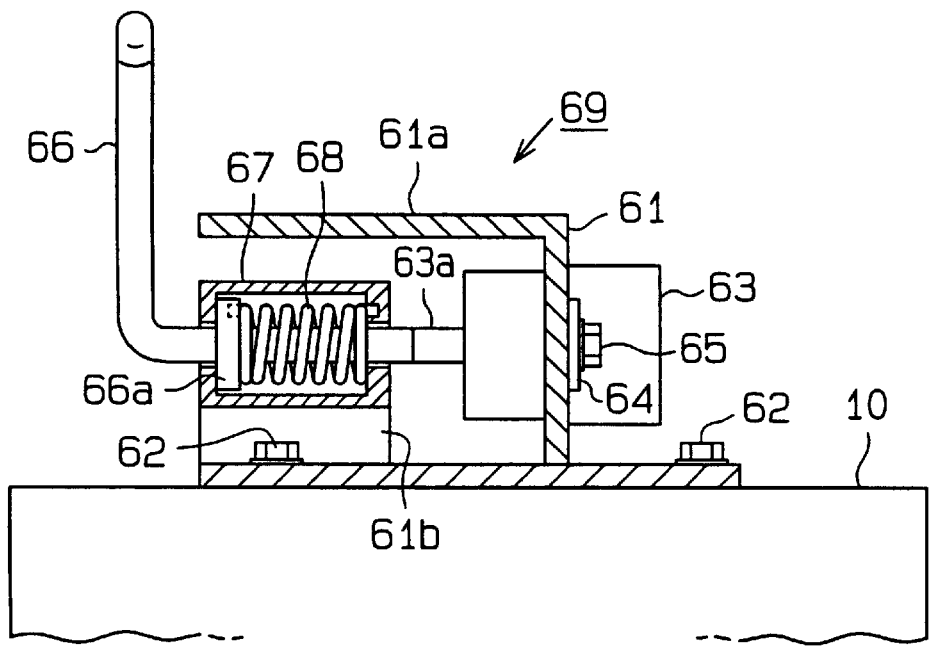
FIG. 11 is a cross-sectional side view illustrating the apparatus of FIG. 10.
Figure 12:
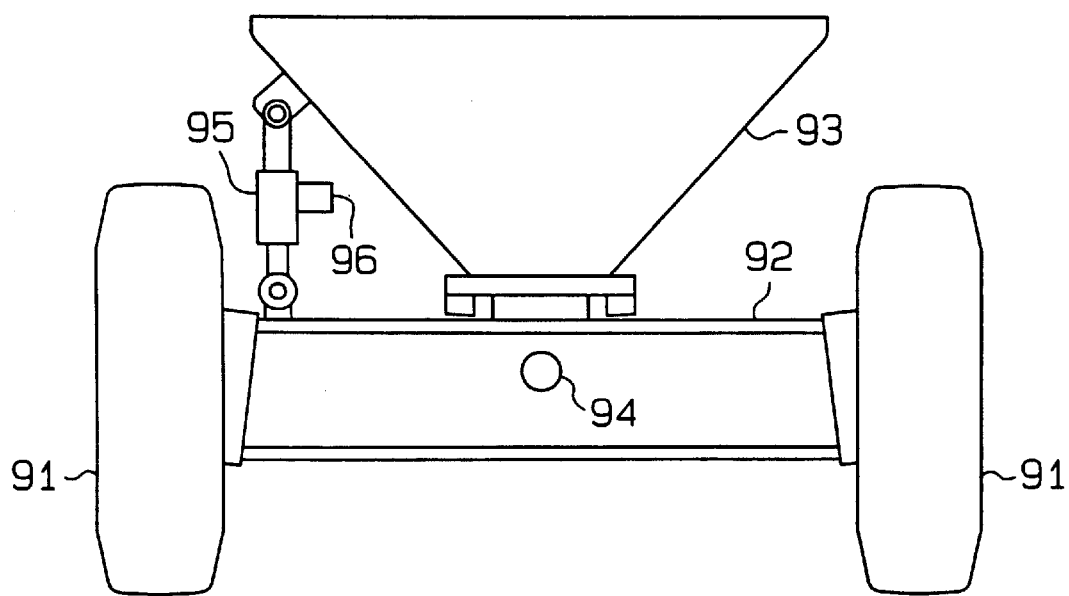
FIG. 12 is a rear view illustrating a prior art axle angle detecting apparatus.

In the apparatus 69 of FIGS. 10 and 11, the distal end of the lever 66 is spaced apart from the center pin 10a by a predetermined distance and is sufficiently far from the axis of the center pin 10a to achieve significant amplification. Therefore, when the rear axle 10 pivots, the potentiometer 63 detects a relatively large motion of the lever 66. In other words, this construction also amplifies changes $\Delta\theta$ of the rear axle pivot angle $\theta$. Therefore, the pivot angle $\theta$ is accurately detected. Further, the embodiment of FIGS. 10 and 11 has the advantages (a), (e) and (f) of the embodiment of FIGS. 1–8.

It should be apparent to those skilled in the art that the present invention may be embodied in many other specific forms without departing from the spirit or scope of the invention. More particularly, the present invention may be modified as described below.

As long as the relative motion of the rear axle 10 to the body frame 1a is detected, the pivot angle detecting apparatuses may be fixed either to the axle 10 or to the body frame 1a. For example, the pivot angle sensor 26 of the embodiment of FIGS. 1–8 may be supported on the rear axle 10.

Also, in the embodiment of FIG. 9, the stroke sensor 53 may be fixed on the body frame 1a and the detection plate 54 may be fixed to the rear axle 10. Further, in the embodiment of FIGS. 10 and 11, the apparatus 69 may be fixed to the body frame 1a and the lever 66 may be pressed against the top surface of the rear axle 10. In these cases, the sensors 53, 63, together with the controller 20, are supported on the body frame 1a. Thus, electric wires from the controller 20 are easily connected to the sensors 53, 63 without considering pivoting of the rear axle 10. These constructions simplify the wiring of the apparatuses 56, 69.

Any apparatus that detects rotational or linear motion may be used. The apparatus is not limited to apparatuses that detect continuous changes of motion. For example, an apparatus having limit switches may be employed. In this case, detection parts such as dogs are formed to correspond to the limit switches of the apparatus. The apparatus detects the pivot angle of the rear axle based on the combination of ON signals and OFF signals of the limit switches. The term "motion" in this specification is not limited to motions having a straight path as long as a motion has a continuous path. For example, if the input shaft of a sensor pivots, the path of the motion is arcuate. This arcuate motion is included in the definition of "motion" in the present specification.

Sensors for detecting the traveling state of the forklift 1 are not limited to the yaw rate sensor 21 and vehicle speed sensor 22. However, any sensors may be used as long as the sensors obtain necessary values for computing the lateral acceleration Gs and the rate of change $\Delta Y/\Delta T$ of the yaw rate Y. For example, the yaw rate sensor 21 may be replaced with a steer angle sensor that detects wheel angle of the rear wheels 11. In this case, the wheel angle and the vehicle speed V are used for computing the lateral acceleration Gs ($=V^2/r$) and the rate of change $\Delta Y/\Delta T$ of the yaw rate Y ($=V\cdot\Delta(1/r)/\Delta T$), wherein "r" is a turn radius judged based on the wheel angle. Also, a combination of an acceleration sensor and the yaw rate sensor 21 may be used for computing the values Gs and $\Delta Y/\Delta T$.

The traveling state of the forklift 1 may be judged based only on the lateral acceleration Gs. The rate of change $\Delta Y/\Delta T$ of the yaw rate Y is not necessarily required. Further, the rate of change $\Delta Gs/\Delta T$ of the lateral acceleration Gs may be used instead of the rate of change $\Delta Y/\Delta T$ of the yaw rate Y.

The axle pivot control may be performed based only on the state of the load. That is, the locking conditions regarding the traveling state may be omitted. In other words, the apparatus of the present invention may be used in a locking apparatus that locks an axle based only on the state of the load.

The terms in this specification are defined as follows.

"Pivot angle control": a control for decreasing pivoting range of an axle. The pivot angle control is not limited to a control for rigidly locking an axle.

"Industrial vehicle": industrial vehicles tnat are controlled by an operator and have working devices. The industrial vehicle is not limited to vehicles for loading and unloading cargo, but includes construction vehicles such as shovel loaders and vehicles for high lift work, as well as forklifts.

Therefore, the present examples and embodiments are to be considered as illustrative and not restrictive and the invention is not to be limited to the details given herein, but may be modified within the scope and equivalence of the appended claims.

What is claimed is:

1. An axle pivot control apparatus for an industrial vehicle having an axis that supports a wheel and is pivotally supported on a frame about a pivot axis, the apparatus comprising:

a single damper, the damper located at one side of the pivot axis to connect the frame and the axle, for locking the axle, and for serving as a shock absorber;

a detector for detecting a pivot angle of the axle, the detector located on one of the frame and the axle at the opposite side of the pivot axis; and a converter for converting pivot motion of the axle into one of rotational and linear motion, wherein the converter actuates the detector in accordance with the converted motion, wherein the converter is spaced from the pivot axis.

2. The apparatus according to claim 1, wherein the converter comprises a link mechanism that amplifies motion of the axle and converts the axle motion into rotational motion.

3. The apparatus according to claim 2, wherein the detector comprises a potentiometer having a rotatable input shaft.

4. The apparatus according to claim 3, wherein the link mechanism includes a first link coupled to the axle, a second link coupled to the input shaft of the detector and a joint coupling the first link with the second link; and wherein the ratio of a distance between the pivot axis of the axle and the axis of the joint to the length of the second link is greater than one.

5. The apparatus according claim 4, wherein the ratio is at least two.

6. The apparatus according claim 1, further comprising a cover for covering the detector.

7. The apparatus according to claim 1, wherein the detector comprises a linear stroke sensor that is supported on the axle, wherein the stroke sensor includes a reciprocal input shaft.

8. The apparatus according to claim 7, further comprising a follower located on a distal end of the input shaft and a plate that is attached to the frame to contact the follower, wherein the follower is urged in a direction to contact the plate and the follower reciprocates in accordance with pivoting of the axle, and wherein the pivot angle of the axle is detected based on the reciprocation amount of the input shaft.

9. The apparatus according to claim 3, wherein the converter comprises:

a lever that is connected to the input shaft and contacts the frame; and a spring that urges the lever in a direction to contact the frame.

10. An axle pivot control apparatus for an industrial vehicle having an axle pivotally supported about a pivot axis on a frame, the apparatus comprising:

a single damper, the damper located between the frame and the axle at one side of the pivot axis to connect the frame and the axle, for locking the axle, and for serving as a shock absorber, wherein the damper extends and contracts in accordance with the pressure of hydraulic oil inside the damper, wherein the damper regulates the pivoting of the axle;

a conduit connected to the damper for permitting oil to enter and exit the damper;

a control valve connected to the conduit for selectively opening and closing the conduit;

a detector, the detector located at the opposite side of the pivot axis for detecting the pivot angle of the axle;

a converter for converting pivot motion of the axle into one of rotational and linear motion, wherein the converter actuates the detector in accordance with the converted motion, wherein the converter is spaced from the pivot axis by a predetermined distance; and a controller that controls the control valve based on the pivot angle detected by the detector, wherein when the controller controls the control valve to open the conduit the conduit permits oil to flow into the damper, and wherein when the conduit is closed oil flow into the damper is prohibited.

11. The apparatus according to claim 10, wherein the converter comprises a link mechanism that amplifies the motion of the axle and converts the axle motion into rotational motion.

12. The apparatus according to claim 11, wherein the detector comprises a potentiometer having a rotational input shaft.

13. The apparatus according to claim 12, wherein the link mechanism includes a first link coupled to the axle, a second link coupled to the input shaft of the detector and a joint coupling the first link with the second link; and wherein the ratio of a distance between the pivot axis of the axle and the axis of the joint to the length of the second link is greater than one.

14. The apparatus according claim 13, wherein the ratio is at least two.

15. The apparatus according to claim 10, further comprising a cover for covering the detector.

16. The apparatus according to claim 10, wherein the detector comprises a linear stroke sensor that is supported on the axle, wherein the stroke sensor includes a reciprocal input shaft.

17. The apparatus according to claim 16, further comprising a follower located on a distal end of the input shaft and a plate that is attached to the frame to contact the follower, wherein the follower is urged in a direction to contact the plate and the follower reciprocates in accordance with pivoting of the axle, and wherein the pivot angle of the axle is detected based on the reciprocation amount of the input shaft.

18. The apparatus according to claim 12, wherein the converter comprises;

a lever that is connected to the input shaft and contacts the frame; and a spring that urges the lever in a direction to contact the frame.

* * * * *

UNITED STATES PATENT AND TRADEMARK OFFICE
CERTIFICATE OF CORRECTION

PATENT NO.   : 6,308,962 B1
DATED        : October 30, 2001
INVENTOR(S)  : Kazuo Ishikawa et al.

It is certified that error appears in the above-identified patent and that said Letters Patent is hereby corrected as shown below:

Title page,
Item [54], Title page please change: "AXLE PIVOT ANGLE DETECTING APPARATUS FOR INDUSTRIAL VEHICLE AND INDUSTRIAL VEHICLE" to -- AXLE PIVOT ANGLE DETECTING APPARATUS FOR INDUSTRIAL VEHICLE --;

Column 1,
Lines 1-3, please change: "AXLE PIVOT ANGLE DETECTING APPARATUS FOR INDUSTRIAL VEHICLE AND INDUSTRIAL VEHICLE" to -- AXLE PIVOT ANGLE DETECTING APPARATUS FOR INDUSTRIAL VEHICLE --.

Signed and Sealed this

Third day of September, 2002

Attest:

Attesting Officer

JAMES E. ROGAN
*Director of the United States Patent and Trademark Office*